US009742914B2

(12) United States Patent
Surdick

(10) Patent No.: US 9,742,914 B2
(45) Date of Patent: Aug. 22, 2017

(54) AGENT EVALUATION SYSTEM

(71) Applicant: Nexidia Inc., Atlanta, GA (US)

(72) Inventor: Robert Troy Surdick, Mableton, GA (US)

(73) Assignee: NEXIDIA INC., Atlanta, GA (US)

( * ) Notice: Subject to any disclaimer, the term of this patent is extended or adjusted under 35 U.S.C. 154(b) by 0 days.

(21) Appl. No.: 14/519,738

(22) Filed: Oct. 21, 2014

(65) Prior Publication Data

US 2016/0112565 A1    Apr. 21, 2016

(51) Int. Cl.
H04M 3/00        (2006.01)
H04M 3/51        (2006.01)

(52) U.S. Cl.
CPC .... *H04M 3/5175* (2013.01); *H04M 2203/401* (2013.01)

(58) Field of Classification Search
CPC .............................................. H04M 2203/402
USPC ..................................... 379/265.06
See application file for complete search history.

(56) References Cited

U.S. PATENT DOCUMENTS

| | | | | |
|---|---|---|---|---|
| 6,363,346 B1* | 3/2002 | Walters | ................... | G10L 17/26 379/112.05 |
| 6,542,972 B2* | 4/2003 | Ignatius | ................ | G06F 3/0605 707/999.01 |
| 7,398,224 B2* | 7/2008 | Cooper | ............ | G06Q 10/06375 705/7.37 |
| 7,664,794 B2* | 2/2010 | Kasmirsky | ........ | G06F 17/30017 369/1 |
| 7,966,687 B2* | 6/2011 | Rahbar-Dehghan | ...... | B08B 1/00 15/104.94 |
| 8,051,086 B2* | 11/2011 | Jeffs | ....................... | G06Q 30/02 707/725 |
| 8,180,027 B1* | 5/2012 | Magnuson | .......... | H04M 3/2281 370/352 |
| 8,195,616 B2* | 6/2012 | Kasmirsky | ........ | G06F 17/30017 707/665 |
| 8,331,549 B2* | 12/2012 | Fama | ..................... | G06Q 10/06 379/265.06 |
| 8,394,133 B2* | 3/2013 | Jackson | ............. | A61B 17/7028 606/302 |
| 9,025,736 B2* | 5/2015 | Meng | ................... | H04M 3/4936 379/265.09 |
| 9,348,855 B2* | 5/2016 | Shazly | .............. | G06F 17/30318 |
| 9,413,891 B2* | 8/2016 | Dwyer | ................ | H04M 3/5175 |

(Continued)

*Primary Examiner* — William Deane, Jr.
(74) *Attorney, Agent, or Firm* — Pearl Cohen Zedek Latzer Baratz LLP

(57) ABSTRACT

A method for determining evaluation information using audio data includes receiving a specification of an evaluation form, the evaluation form including a number of questions, each question having a number of possible answers. A user is received indicating that a first answer of the number of possible answers for a first question of the number of questions should be determined automatically from the audio data, the audio data including speech of a subject. A user input is received associating a first constraint of a plurality of constraints with the first answer. The audio data is processed to determine whether the audio data putatively satisfies the first constraint. The first answer is assigned as an answer to the first question if the audio data putatively satisfies the first constraint. The first answer is stored as the answer to the first question in the evaluation form.

14 Claims, 13 Drawing Sheets

(56) References Cited

U.S. PATENT DOCUMENTS

| | | | | |
|---|---|---|---|---|
| 2001/0040942 | A1* | 11/2001 | Glowny | G11B 31/00 379/88.22 |
| 2003/0154072 | A1* | 8/2003 | Young | G06F 17/30017 704/9 |
| 2004/0193740 | A1* | 9/2004 | Kasmirsky | G06F 17/30017 710/1 |
| 2006/0198504 | A1* | 9/2006 | Shemisa | H04M 3/2281 379/201.02 |
| 2007/0198330 | A1* | 8/2007 | Korenblit | G06Q 10/06316 705/7.42 |
| 2008/0187109 | A1* | 8/2008 | Meng | H04M 3/4936 379/88.01 |
| 2010/0138459 | A1* | 6/2010 | Kasmirsky | G06F 17/30017 707/812 |
| 2015/0156327 | A1* | 6/2015 | Van Buren | H04M 3/4936 370/352 |
| 2015/0195157 | A1* | 7/2015 | Nayyar | H04L 43/0852 709/224 |

\* cited by examiner

Evaluation Configuration Tool — 322

| Question | Answer | Points | Auto-Suggest |
|---|---|---|---|
| "Did the agent greet the customer correctly?" | Yes | 5 | ☐ (none) |
|  | No | 0 | ☐ (none) |
| "Did the agent keep the call flowing and avoid excessive hold times?" | Yes | 10 | ☐ (none) |
|  | No | 0 | ☐ (none) |

331 — 330 — 340 — 332 — 338 — 339

Done

FIG. 5

Query: "Greeting" — 442

"Thank you for calling <company name>", AND
"My name is", AND
"How may I help you"
all within the first 20 seconds of the call

FIG. 6

Target Media Set: "Call Flow" — 544

Call Duration must exceed 30 seconds
Non-Talk Percentage must be less than 25%

FIG. 7

Evaluation Configuration Tool — 322

| Question | Answer | Points | Auto-Suggest |
|---|---|---|---|
| "Did the agent greet the customer correctly?" | Yes | 5 | ☑ (select) — 646 |
|  | No | 0 | ☐ (none) |
| "Did the agent keep the call flowing and avoid excessive hold times?" | Yes | 10 | ☐ (none) |
|  | No | 0 | ☐ (none) |

338

331

330

Done

Evaluation Configuration Tool — 322
— 331

| Question | Answer | Points | Auto-Suggest |
|---|---|---|---|
| "Did the agent greet the customer correctly?" | Yes | 5 | ☑ "Greeting" Query — 646 |
| | No | 0 | ☐ (none) |
| "Did the agent keep the call flowing and avoid excessive hold times?" | Yes | 10 | ☐ (none) |
| | No | 0 | ☐ (none) |

— 330

[Done]

FIG. 11

Evaluation Configuration Tool — 322
— 331

| Question | Answer | Points | Auto-Suggest |
|---|---|---|---|
| "Did the agent greet the customer correctly?" | Yes | 5 | ☑ "Greeting" Query — 646 |
| | No | 0 | ☑ NOT "Greeting" Query — 947 |
| "Did the agent keep the call flowing and avoid excessive hold times?" | Yes | 10 | ☐ (none) |
| | No | 0 | ☐ (none) |

— 330

[Done]

Evaluation Configuration Tool
331

| Question | Answer | Points | Auto-Suggest |
|---|---|---|---|
| "Did the agent greet the customer correctly?" | Yes | 5 | ☑ "Greeting" Query |
|  | No | 0 | ☑ NOT "Greeting" Query |
| "Did the agent keep the call flowing and avoid excessive hold times?" | Yes | 10 | ☑ (select) |
|  | No | 0 | ☐ (none) |

Done

FIG. 12

Evaluation Configuration Tool — 331

| Question | Answer | Points | Auto-Suggest |
|---|---|---|---|
| "Did the agent greet the customer correctly?" | Yes | 5 | ☑ "Greeting" Query |
|  | No | 0 | ☑ NOT "Greeting" Query |
| "Did the agent keep the call flowing and avoid excessive hold times?" | Yes | 10 | ☑ "Call Flow" |
|  | No | 0 | ☐ (none) — 1049 |

330 — 1033

[ Done ]

Evaluation Configuration Tool — 331

| Question | Answer | Points | Auto-Suggest |
|---|---|---|---|
| "Did the agent greet the customer correctly?" | Yes | 5 | ☑ "Greeting" Query |
|  | No | 0 | ☑ NOT "Greeting" Query |
| "Did the agent keep the call flowing and avoid excessive hold times?" | Yes | 10 | ☑ "Call Flow" |
|  | No | 0 | ☑ NOT "Call Flow" — 1353 |

336 — 1370

[ Done ]

FIG. 15

AGENT EVALUATION SYSTEM

BACKGROUND

This invention relates to evaluation of agents in a customer service call center.

Customer service call centers generally employ a number of customer service representatives (referred to herein as customer service 'agents') who answer calls from customers for the purpose of resolving customer service issues. Agent performance in resolving customer service issues is critical to ensuring customer satisfaction and therefore the success of a business unit associated with the customer service call center. As such, the performance of the agents employed by call centers is regularly evaluated.

In some examples, to evaluate an agent at a customer service call center, an evaluation agent (e.g., the agent's supervisor or a third party organization) listens to one or more calls between the agent and customers. The evaluation agent then manually fills out an evaluation form based on what they heard in the one or more calls. Very generally, the evaluation form includes a number of questions which are designed to gauge the agent's performance.

SUMMARY

In some examples, fully manual evaluation of agent performance can be time consuming and prone to user error. For example, an evaluation agent may have numerous other responsibilities in addition to their agent evaluation responsibilities. Furthermore, it is often the case that the evaluation agent is distracted or is attempting to multi-task and may therefore miss events in a call that are pertinent to the agent's evaluation.

Aspects described herein reduce the workload on evaluation agents by utilizing speech analytics to automatically suggest answers to questions included in evaluation forms based on information that is automatically gleaned from the evaluated call.

In an aspect, in general, a computer implemented method for determining evaluation information using audio data includes receiving a specification of an evaluation form, the evaluation form including a number of questions, each question having a number of possible answers, receiving input from a user indicating that a first answer of the number of possible answers for a first question of the number of questions should be determined automatically from the audio data, the audio data including speech of a subject, receiving input from the user associating a first constraint of a number of constraints with the first answer, processing the audio data to determine whether the audio data putatively satisfies the first constraint, assigning the first answer as an answer to the first question if the audio data putatively satisfies the first constraint, and storing the first answer as the answer to the first question in the evaluation form.

Aspects may include one or more of the following features.

The first answer may be associated with an evaluation point value, the method further comprising determining an overall evaluation score including adding the evaluation point value associated with the first answer to the overall evaluation score if the audio data putatively satisfies the first constraint. If the audio data putatively satisfies the first constraint, an indication of a time in the audio data at which the audio data putatively satisfies the first constraint to the user may be presented. An indication of the user's desire to listen to the time in the audio data at which the speech of the audio data putatively satisfies the first constraint may be received, and in response to the indication, a portion of the audio data proximal to a time in the audio data at which the audio data putatively satisfies the first constraint may be presented.

If the first answer is assigned to the first question, an input from the user confirming that the first answer to the first question is satisfied by the audio data may be received. If the first answer is assigned to the first question, an input from the user assigning a second answer of the number of answers for the first question as the answer to the first question may be received. The first constraint may include a textual expression. Processing the audio data to determine whether the audio data putatively satisfies the first constraint may include identifying putative instances of the textual expression. The first constraint may include a temporal constraint and processing the audio data to determine whether the audio data putatively satisfies the first constraint may include determining whether the putative instances of the textual expression satisfy the temporal constraint The first constraint may include a Boolean expression. The first constraint may include a metadata constraint and processing the audio data to determine whether the audio data putatively satisfies the first constraint may include comparing a metadata of the audio data to the metadata constraint. At least some of the number of possible answers for at least some of the number of questions may be answered manually. The method may further include selecting the audio data from a number of audio data units based on quality of the audio data. The quality of the audio data may include an audio quality of the audio data. The quality of the audio data may include a quality of a content of the audio data. Processing the audio data to determine whether the audio data putatively satisfies the first constraint may include processing the speech of the subject in the audio data.

In another aspect, in general, a computer implemented system for determining evaluation information using audio data includes an input for receiving a specification of an evaluation form, the evaluation form including a number of questions, each question having a number of possible answers, an input for receiving input from a user indicating that a first answer of the number of possible answers for a first question of the number of questions should be determined automatically from the audio data, the audio data including speech of a subject, an input for receiving input from the user associating a first constraint of a number of constraints with the first answer, an audio processor for processing the audio data to determine whether the audio data putatively satisfies the first constraint, and a form completion module for assigning the first answer as the answer to the first question if the audio data satisfies the first constraint and storing the first answer as the answer to the first question in the evaluation form.

In yet another aspect, in general, a computer readable medium includes software embodied on the medium, the software including instructions for causing an information processing system to receive a specification of an evaluation form, the evaluation form including a number of questions, each question having a number of possible answers, receive input from a user indicating that a first answer of the number of possible answers for a first question of the number of questions should be determined automatically from the audio data, the audio data including speech of a subject, receive input from the user associating a first constraint of a number of constraints with the first answer, process the audio data to determine whether the audio data putatively satisfies the first constraint, assign the first answer as an answer to the first question if the audio data putatively satisfies the first constraint, and store the first answer as the answer to the first question in the evaluation form.

Aspects may have one or more of the following advantages.

Aspects may reduce the time required for evaluation agents to complete evaluation forms for call center agents relative to the time required by conventional, fully manual evaluation processes. For example, aspects may automatically suggest answers to evaluation form questions based on the findings from a speech analytics system, thereby expediting the evaluation process.

Aspects may reduce the likelihood that evaluation agents will incorrectly answer evaluation form questions because they simply missed something that occurred in the call being evaluated, thereby reducing subjectivity.

Call centers are regularly looking at ways to cut costs and run more efficiently. Aspects provide customers of our products with a means to reduce the time and effort it takes their employees (or 3rd party vendors) to perform a critical and frequently-occurring task.

Other features and advantages of the invention are apparent from the following description, and from the claims.

DESCRIPTION OF DRAWINGS

FIG. 5 is an agent evaluation configuration tool.

FIG. 6 is a query specification.

FIG. 7 is a target media set specification.

FIG. 8 is an evaluation configuration tool with an auto-suggest check box associated with a first answer value checked.

FIG. 10 is the evaluation configuration tool with a completed auto-suggest query configuration for the first answer value.

FIG. 11 is the evaluation configuration tool with a completed auto-suggest query configuration for a second answer value.

FIG. 12 is the evaluation configuration tool with an auto-suggest check box associated with a third answer value checked.

FIG. 14 is the evaluation configuration tool with a completed auto-suggest target media set configuration for the third answer value.

FIG. 15 is the evaluation configuration tool with a completed auto-suggest target media set configuration for a fourth answer value.

DESCRIPTION

1 Overview

Figure 1:
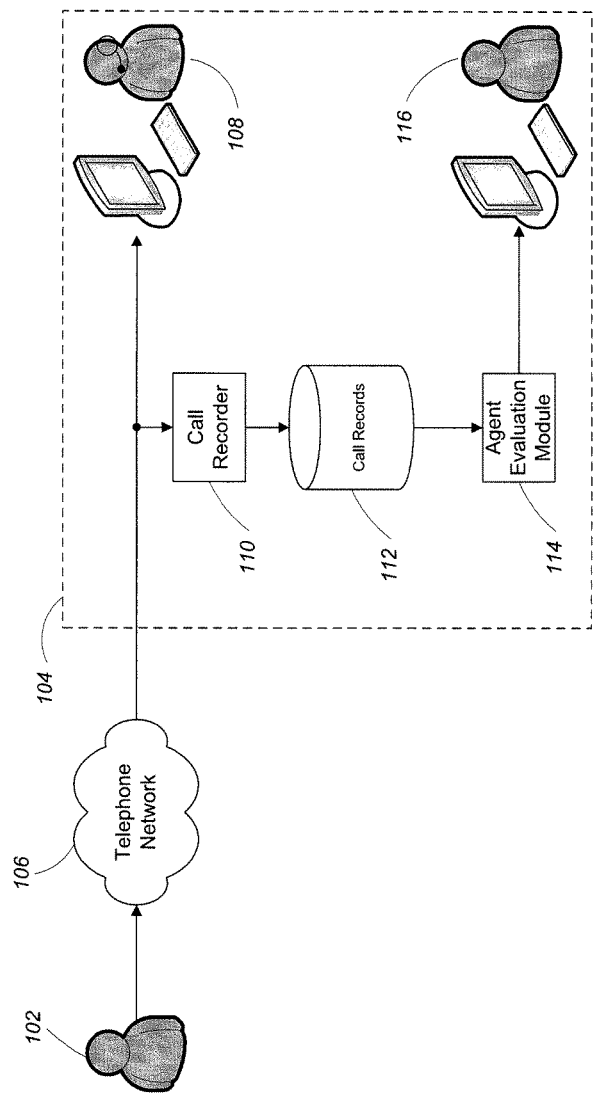
FIG. 1 is a customer service call center in communication with a customer.

Referring to FIG. 1, in an exemplary scenario, a representative customer 102 is in communication with a customer service call center 104 via a telephone network 106. In general, the customer service call center 104 is associated with an entity (e.g., a business) that provides services to the customer 102. The customer 102 may initiate contact with the customer service call center 104 for a variety of reasons, including resolving problems associated with the services that the entity provides to the customer 102, for informational purposes, and for account services.

The customer service call center 104 includes a representative customer service agent 108 (e.g., a telephone operator), a call recording system 110, a call records database 112, agent evaluation module 114, and a representative evaluation agent 116 (e.g., the customer service agent's supervisor).

At the customer service call center 104, the customer service agent 108 conducts the call with the customer 102. The call recorder 110 records the call between the customer 102 and the customer service agent 108 and stores the recorded call (sometimes referred to as a "call record") in the call records database 112.

In some examples, the customer service call center 104 provides the customer service agent 108 with a script that they are required to follow for the purpose of providing quality customer service to the customer 102. For the customer service call center 104 to provide satisfactory customer service to the customer 102, it is important that the customer service agent 108 follows the script. To ensure that the customer service agents 108 are following the script, calls between the agents 108 and customers are regularly evaluated by the evaluation agent 116.

For example, at some time after a call between the customer service agent 108 and a customer 102 is stored in the call records database, the evaluation agent 116 recalls the recorded call from the call records database 112 and evaluates the customer service agent's 108 performance with the assistance of the agent evaluation module 114.

2 Agent Evaluation Module

Figure 2:
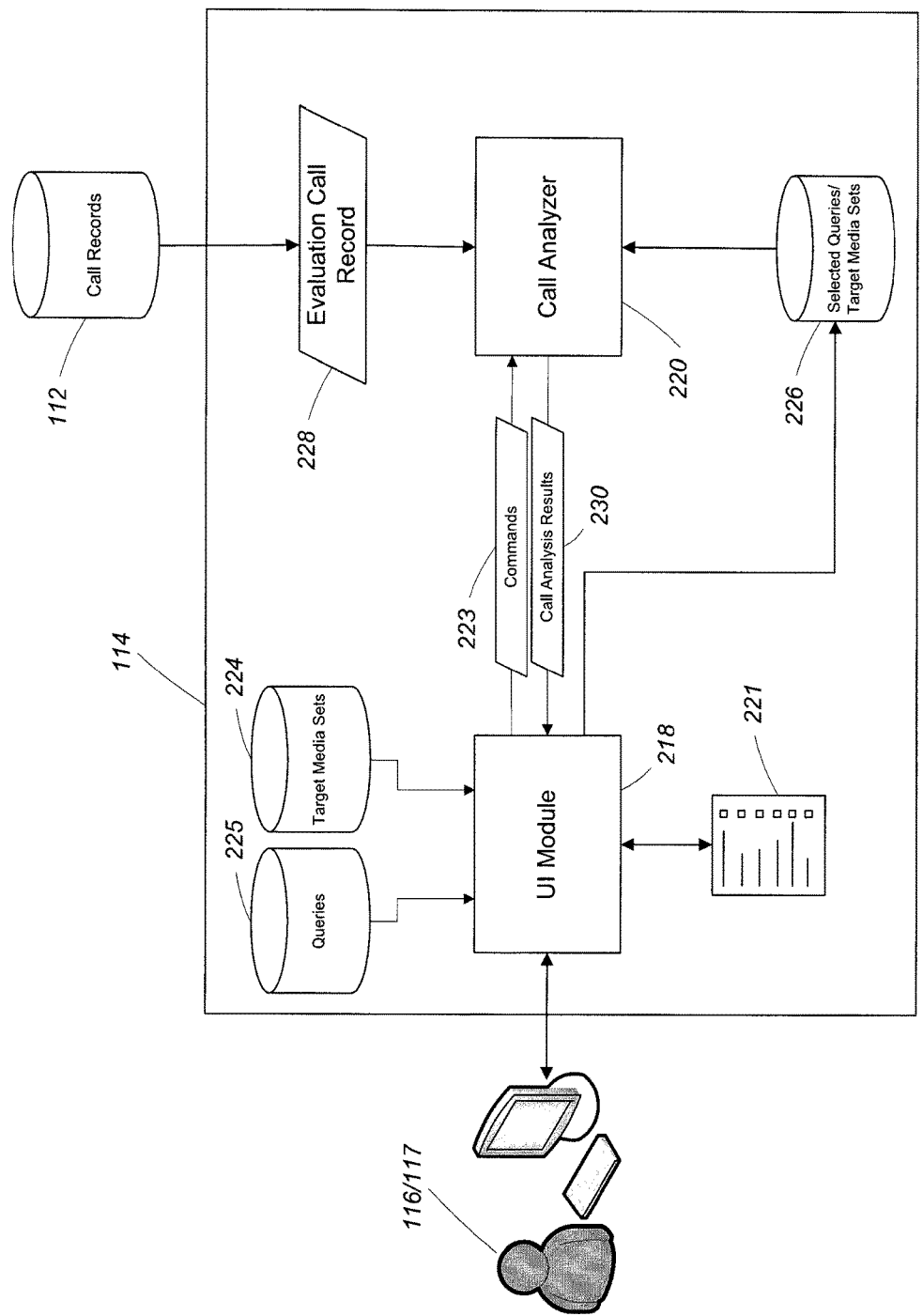
FIG. 2 is an agent evaluation module.

Referring to FIG. 2, the agent evaluation module 114 includes a UI module 218 and a call analyzer 220. The UI module 218 is configured to receive, as input, one or more of an evaluation form 221, a set of queries 224, a set of target media sets 225, call analysis results 230 from the call analyzer 220, and input from an administrative user 117 or an evaluation agent 116. The UI module 218 is configured to provide, as output, commands 223 (e.g., commands received from the user/agent 117/116) to the call analyzer 220 and to output a selection of queries and/or target media sets 226.

The call analyzer 220 is configured to receive, as input, the commands 223 from the UI Module 218, the selected queries and/or target media sets 226, and an evaluation call record 228. The call analyzer 220 analyzes the evaluation call record 228 according to the commands 223 and the selected queries and/or target media sets 226, to generate the call analysis results 230 which it provides back to the UI module 218.

In general, the agent evaluation module 114 is operable in two modes: a configuration mode and an evaluation mode.

2.1 Configuration Mode

Figure 3:
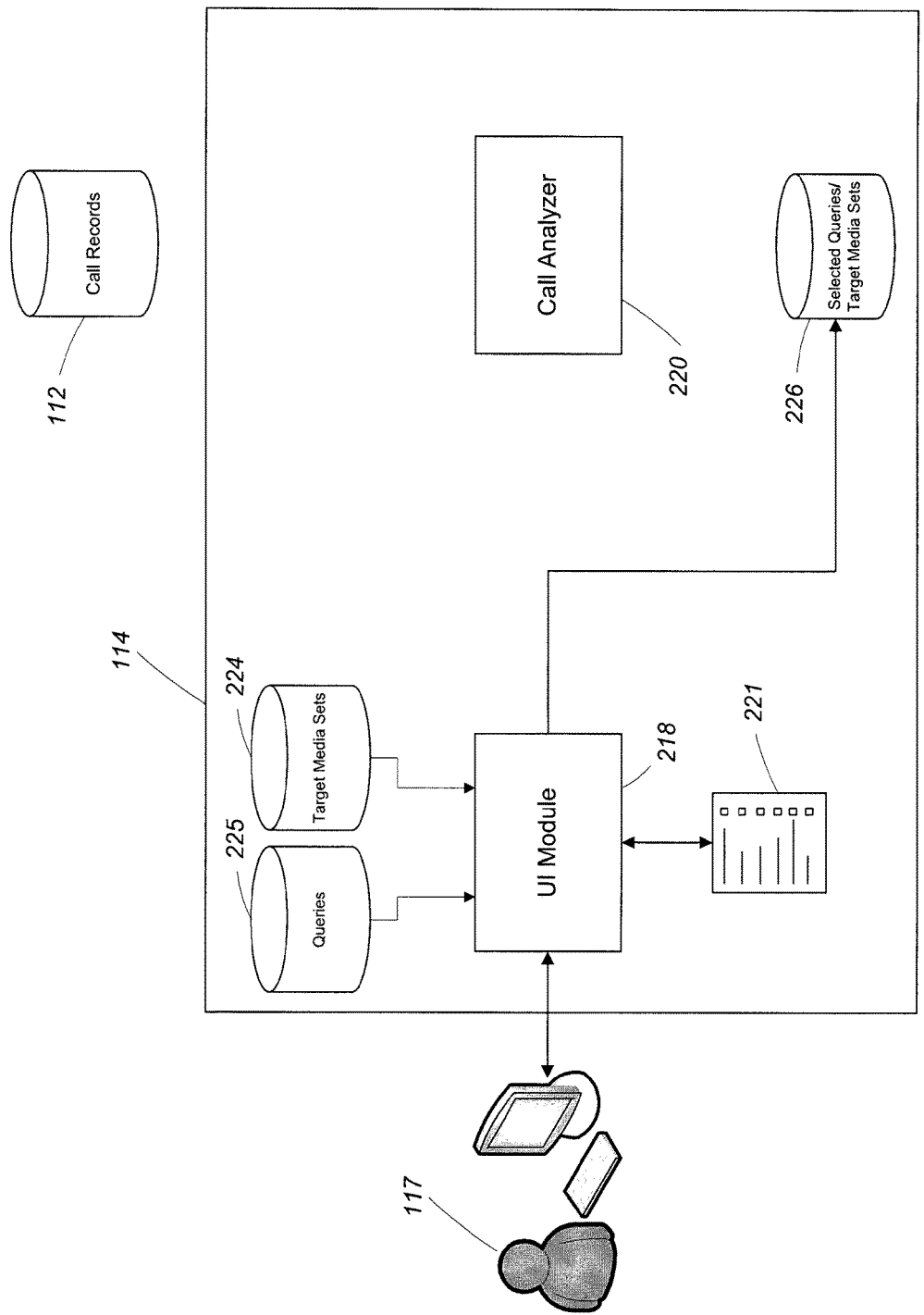
FIG. 3 is the agent evaluation module in a configuration mode.

Referring to FIG. 3, in the configuration mode of the agent evaluation module 114, the UI module 218 receives the evaluation form 221, the set of queries 224, the set of target media sets 225, and input from an administrative user 117. In some examples, the evaluation form 221 includes a number of evaluation questions that are used to evaluate the performance of the agents who work at the customer service call center 104. The UI module 218 presents the evaluation form 221, including some or all of the evaluation questions, to the administrative user 117 (e.g., via a configuration user interface, described in greater detail below) who associates one or more queries and/or target media sets (which are described in greater detail below) from the set of queries 224 and/or the set of target media sets 225 with at least some of the evaluation questions included in the evaluation from 221.

The selected queries and/or target media sets 226 are output from the UI module 218 and stored (e.g., in a data storage device) for later use in the evaluation mode of the agent evaluation module 114.

2.2 Evaluation Mode

Figure 4:
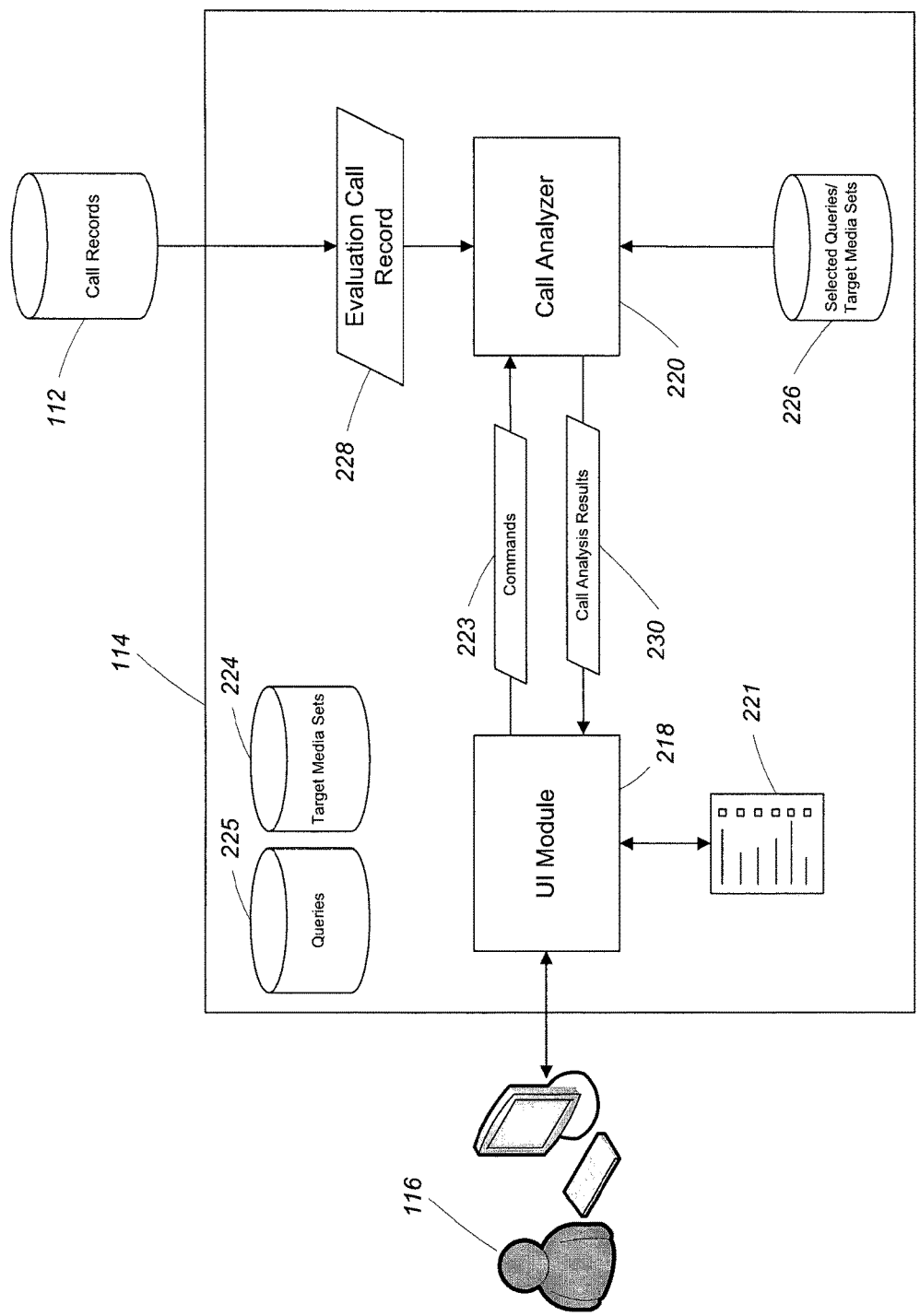
FIG. 4 is the agent evaluation module in an evaluation mode.

Referring to FIG. 4, in the evaluation mode of the agent evaluation module 114, the UI module 218 receives the evaluation form 221 and input from the evaluation agent 116. In some examples, when the evaluation agent 116 indicates that the evaluation call record 228 should be analyzed, the commands 223 provided to the call analyzer 220 trigger evaluation of the evaluation call record 228.

The call analyzer 220 also receives the evaluation call record 228 and the selected queries and/or target media sets 226. The call analyzer 220 analyzes the evaluation call record 228 according to the selected queries and/or target media sets 226 and generates the call analysis results 230. The call analysis results 230 are provided to the UI module 218 where they are presented to the evaluation agent 116 as putative answers to the evaluation questions that are associated with the selected queries and/or target media sets 226.

In some examples, the evaluation agent 116 evaluates the putative answers to the evaluation questions and provides input to the UI module 218 to accept or reject the putative answers. In some examples, the evaluation agent 116 also listens to some or all of the evaluation call record 228 to determine answers to any of the evaluation questions included in the evaluation form 221 that are not automatically determined by the call analyzer 220. In some examples, the system suggests a portion of the evaluation call record 228 that the evaluation agent 116 should listen to in order to validate the suggested answers.

Once all of the evaluation questions included in the evaluation form 221 are answered (either manually or automatically), an evaluation score for the evaluation call record is calculated and is used as a performance indicator for the customer service agent 108.

3 Evaluation Configuration Tool

Referring to FIG. 5, in some examples, when in the agent evaluation module 114 is in the configuration mode, the UI module 218 presents an evaluation configuration tool 322 to the administrative user 117. The evaluation configuration tool 322 is a tool for presenting questions from the evaluation form 221 to the administrative user 117 such that the administrative user 117 can configure the agent evaluation module 114 to automatically answer some or all of the questions. For example, in FIG. 5, the evaluation configuration tool 322 presents a first evaluation question 331 from the evaluation form 221 which asks "Did the agent greet the customer correctly?"

The evaluation configuration tool 322 includes an answer column 332. For at least some of the questions 330 in the evaluation form 221, the answer column 332 includes a number of answer rows 339, each answer row 339 being associated with one of a number of discrete answer values 340 for the question (e.g., a yes/no or a pass/fail answer). Each discrete answer value 340 is associated with a number of points. For example, in FIG. 5, if the evaluation agent 116 provides an answer value of 'Yes' for the first evaluation question 331, five points are added to the customer service agent's 108 evaluation score. Alternatively, if the evaluation agent 116 provides an answer value of 'No' for the first evaluation question 331, then zero points are added to the customer service agent's 108 evaluation score.

Each answer row 339 also includes an auto suggest field 336 that includes an auto-suggest checkbox 338. For example, in FIG. 5 the auto-suggest column 336 includes an auto-suggest checkbox for both the 'Yes' and 'No' answer values 332 associated with the first evaluation question 331. When the administrative user 117 clicks on an auto-suggest checkbox 338 for a given answer (causing the checkbox 338 to be 'checked'), they are indicating that they would like the call analyzer 220 to automatically analyze the evaluation call record 228 for the purpose of suggesting whether the given answer is true. For example, by clicking the auto-suggest check box 338 for the 'Yes' answer value associated with the first evaluation question 331, the administrative user 117 indicates that the call analyzer 220 should automatically analyze the evaluation call record 228 to determine whether the answer to the first evaluation question 331 is 'Yes.' Similarly, by clicking the auto-suggest checkbox 338 for the 'No' answer value associated with the first evaluation question 331, the administrative user 117 indicates that the call analyzer 220 should automatically analyze the evaluation call record 228 to determine whether the answer to the first evaluation question 331 is 'No.'

In some examples, the call analyzer 220 uses queries and/or target media sets selected by the administrative user 117 from the set of queries 224 and the set of target media sets 225 to automatically analyze the evaluation call record 228. As is described in greater detail below, queries and target media sets are two types of constraints that can be used by the call analyzer 220 to process the evaluation call record 228. In some examples, the set of queries 224 and the set of target media sets 225 are predefined (e.g., by a supervisor or analyst associated with the customer service call center).

Referring to FIG. 6, one example of a query 442 (sometimes referred to as a 'structured query') is specified as a constraint the can be applied to the evaluation call record 228. The exemplary query of FIG. 6 is titled "Greeting" and is designed to evaluate whether the customer service agent 108 has properly followed a scripted greeting in the evaluation call record 228. For the query 442 to be satisfied, the customer service agent 108 must have said the phrases 'Thank you for calling <company name>,' and 'My name is,' and 'How may I help you' within the first 20 seconds of the evaluation call record 228. In some examples, an evaluation call record 228 which satisfies a query is referred to as a query 'hit' and an evaluation call record 228 which does not satisfy a query is referred to as a query 'miss.'

In general, queries can be used to search recorded audio in the evaluation call record 228 for specific words, phrases, or topics of conversation. For example, queries may be specified to search for phrases included in a standard script of spoken phrases that are required for compliance purposes, phrases that are indicative of a desired business process being followed (e.g., 'in order to verify your identify, can you please tell me . . . '), and phrases that are indicative of a business topic of interest (e.g., 'your order confirmation number is . . . ', 'cancel my account', etc.). As is illustrated in FIG. 6, complex queries can be defined by the use of Boolean operators. Furthermore, queries can be limited to certain portions of the evaluation call record 228 (e.g., within the first 20 seconds of the call record).

Referring to FIG. 7, one example of a target media set 544 that can be used to group calls based on query hits and/or metadata associated with the evaluation call record 228. For example, in FIG. 7, the target media set 544 is titled 'Call Flow' and is used to create a target media set that includes call records with a duration greater than 30 seconds where the non-talk percentage is less than 25%.

In some examples, target media sets can be used to ensure that customers have a positive experience when calling a customer service call center. For example, target media sets can be created to identify calls that exceed a given duration, and have some minimum percentage of non-talk time, realizing that a customer who spends a long time on the phone and is put on hold for a significant percentage of that time may not be a satisfied customer.

In some examples, the call analyzer 220 of FIG. 2 applies queries and target media sets to the evaluation call record 228 using techniques such as those described for example, in U.S. Pat. No. 7,487,086, titled "Transcript Alignment," which is incorporated herein by reference.

In some examples, the call analyzer 220 also calculates metadata including the amount and percentage of various metrics related to the audio file (e.g., the duration of the file, the amount and percentage of speech in the file, the amount, and the percentage of non-speech such as silence or hold music in the file). In some examples, the calculated metadata, as well as the data indicating which queries are found in each call (and where in the call they are found) is stored in a database.

Referring to FIG. 8, when the administrative user 117 checks an auto-suggest checkbox 338 (e.g., the auto-suggest checkbox 338 for the 'Yes' answer value of the first evaluation question 331 in the evaluation configuration tool 322), a '(select)' hyperlink 646 appears adjacent to the auto-suggest checkbox 338. When the administrative user 117 clicks on the hyperlink 646, a query/media set selection user interface is presented to the administrative user 117.

Figure 9:
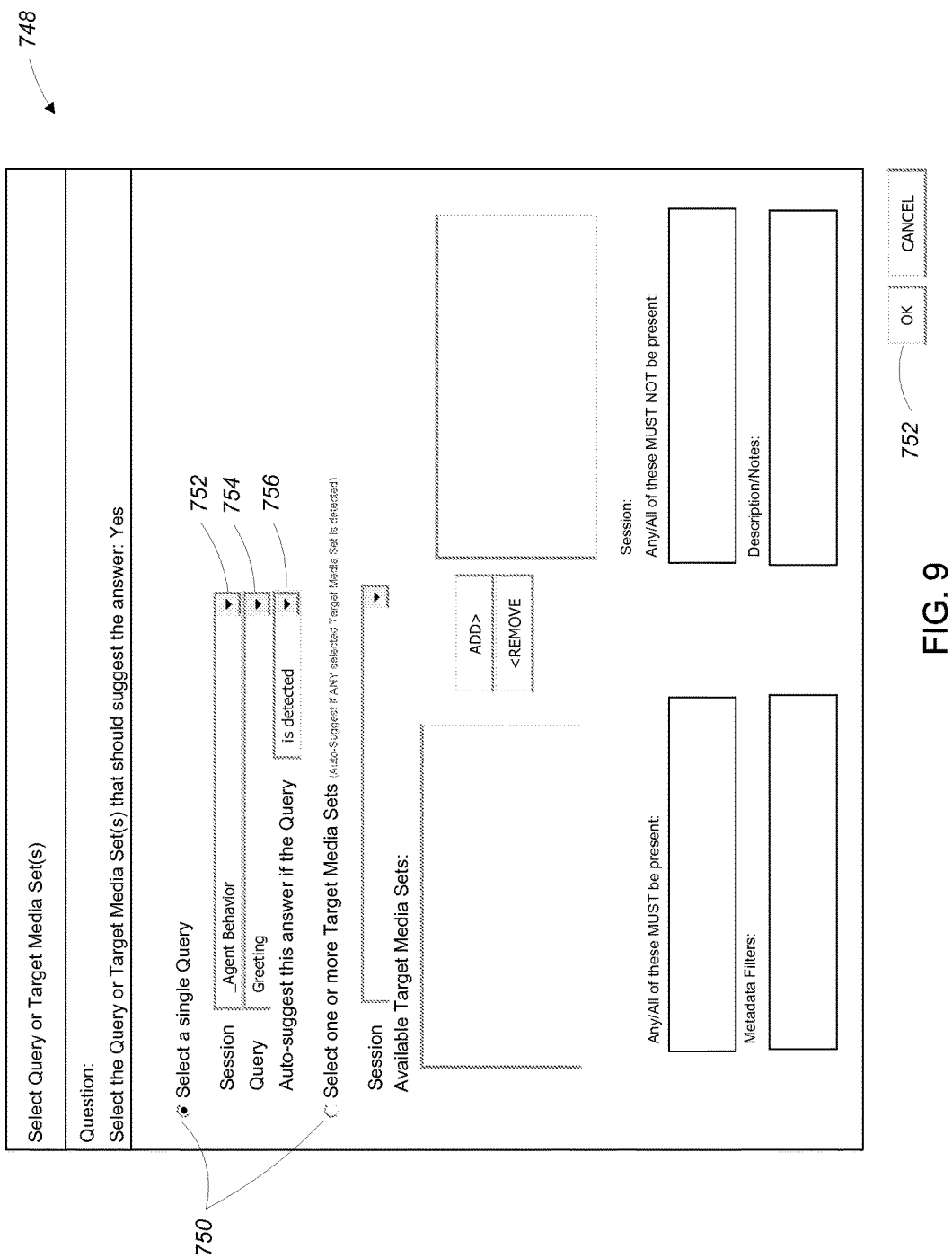
FIG. 9 is a query or target media set user interface configured for query selection.

Referring to FIG. 9, one example of the query/media set selection user interface 748 includes a type control 750 for selecting whether a single query or a target media set should be used to automatically analyze the evaluation call record 228 for a given answer associated with a given evaluation question. In FIG. 9, the administrative user 117 has chosen a query type using the type control 750, a number of dropdown menus including a 'Session' dropdown menu 752, a 'Query' dropdown menu 754, and an 'Auto-suggest this answer if the Query is' dropdown menu 756. The 'Session' dropdown menu 752 allows the administrative user 117 to select a type of call that is to be evaluated. For example, the administrative user 117 may use the 'Session' dropdown menu 752 to specify that sales calls are being evaluated. Based on the administrative user's selection in the 'Session' dropdown menu 752, the queries in the set of queries 224 can be filtered such that only those queries that are pertinent to the selection are presented to the administrative user 117. The 'Query' dropdown menu 754 allows the administrative user 117 to choose from the pertinent queries from the set of queries 224. The 'Auto-suggest this answer if the Query is' dropdown menu 756 allows the administrative user 117 to specify whether an answer associated with the query is auto-suggested if the query is satisfied or if the answer associated with the query is auto-suggested if the query is not satisfied.

For example, in FIG. 8 the administrative user 117 checked the auto-suggest checkbox 338 for the 'Yes' answer value of the first evaluation question 331. Upon entering the query/media set selection user interface 748, the administrative user 117 has selected the single query type from the type control 750. The administrative user 117 has specified that they are working in the 'Agent Behavior' session using the 'Session' dropdown menu 752. Using the 'Query' dropdown menu 754, the administrative user 117 has also specified the predefined 'Greeting' query should be used to auto-suggest the 'Yes' answer value for the first evaluation question 331. Finally, using the 'Auto-suggest this answer if the Query' dropdown menu 756, the administrative user 117 has selected that the 'Yes' answer should be auto-suggested for the first evaluation question 331 if the 'Greeting' query is detected.

After selecting the single query for the 'Yes' answer value associated with the first evaluation question 331, the administrative user 117 can click an 'OK' button 751 in the query/media set selection user interface 748 to confirm their selection. Referring to FIG. 10, after the administrative user 117 confirms their selection in the query/media set selection user interface 748, the query/media set selection user interface 748 closes and the evaluation configuration tool 322 is again presented to the administrative user 117. In some examples, the hyperlink 646 associated with an answer to a question 330 updates to reflect the query or media set selected by the administrative user 117 via the query/media set selection user interface 748. For example, in FIG. 10, the hyperlink 646 is updated to reflect that the administrative user 117 has selected the 'Greeting' Query for the 'Yes' answer associated with the first evaluation question 331.

Referring to FIG. 11, the administrative user 117 can then repeat the query selection process for the 'No' answer associated with the first evaluation question 331 by checking the auto-suggest checkbox 338 and then clicking the '(select)' hyperlink 646 to enter the query/media set selection user interface 748. For the 'No' answer to the first evaluation question 331, the administrative user 117 can choose the same, 'Greeting' query and can choose 'is NOT detected' from the 'Auto-suggest this answer if the Query' dropdown menu 756. After clicking the 'OK' button 751 in the query/media set selection user interface 748, the hyperlink 947 for the 'No' answer for the first evaluation question 331 is updated to read 'NOT "Greeting" Query.' At this point, the auto-suggest fields 336 for both the 'Yes' and 'No' answers for the first evaluation question 331 are complete, with an auto-suggest result of 'Yes' if the 'Greeting' query is satisfied by the evaluation call record 228 and an auto-suggest result of 'No' if the 'Greeting' query is not satisfied by the evaluation call record 228.

Referring to FIG. 12 a second type of evaluation question 1033 is best evaluated using a target media set. For the second evaluation question 1033, the administrative user 117 has checked the auto-suggest checkbox 338 associated with the 'Yes' answer. The administrative user 117 can then click the '(select)' hyperlink 1049 to enter the query/media set selection user interface 748. The administrative user 117 can then select the 'Select one or more Target Media Sets' type using the type control 750. Upon selecting the 'Select one or more Target Media Sets' type, a number of controls, including a 'Session' dropdown menu 1158, an 'Available Target Media Sets' menu 1160, and a 'Selected Target Media Sets' indicator 1162, become active. A number of indicators, including an 'Any/All of these MUST be present' indicator 1164, a 'Metadata Filters' indicator 1166, an 'Any/All of these MUST NOT be present' indicator 1168, and a 'Description/Notes' indicator 1170.

As was the case above, the 'Session' dropdown menu 1158 allows the administrative user 117 to select a type of call that is to be evaluated. For example, the administrative user 117 may use the 'Session' dropdown menu 1158 to specify that sales calls are being evaluated. Based on the administrative user's selection in the 'Session' dropdown menu 1158, the target media sets in the set of target media sets 225 can be filtered such that only those target media sets that are pertinent to the selection are presented to the administrative user 117. The 'Available Target Media Sets' dropdown menu 1160 allows the administrative user 117 to choose from the pertinent target media sets from the set of target media sets 225. After the administrative user 117 selects one or more of the target media sets from the 'Available Target Media Sets' menu 1160, they can click an 'Add' button to add the selected target media sets to the 'Selected Target Media Sets' menu 1162. The target media sets listed in the 'Selected Target Media Sets' menu 1162 represent the target media sets that will be applied to the evaluation call record 228 by the call analyzer 220.

The various indicators 1164, 1166, 1168, 1170 provide a summary of the constraints specified by a currently selected (i.e. highlighted) target media set. For example, the 'Any/All of these MUST be present' indicator 1164 and the 'Any/All of these MUST NOT be present' indicator 1168 summarize queries associated with the currently selected target media set that are required to be detected or not detected, respectively, in order for an answer to be auto-suggested. The 'Metadata Filters' indicator 1166 summarizes metadata constraints associated with the currently selected target media set that must be satisfied in order for an answer to be auto-suggested. The 'Description/Notes' indicator 1170 provides the evaluation agent 116 with a short description of the currently selected target media set.

Figure 13:
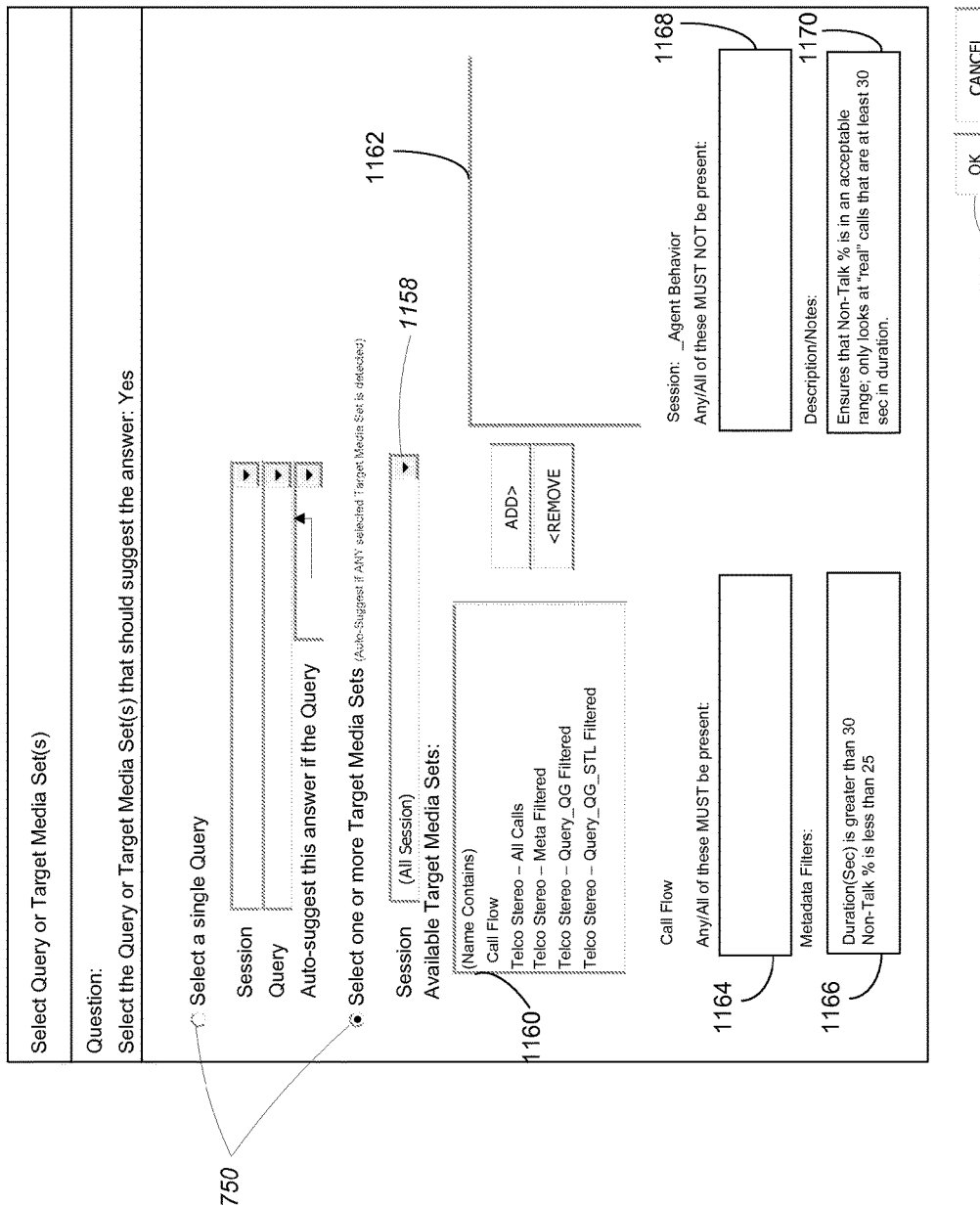
FIG. 13 is a query or target media set user interface configured for target media set selection.

In FIG. 13 the 'Call Flow' target media set is selected and the 'Metadata Filters' indicator 1166 indicates that, for a call record to meet the criteria of the 'Call Flow' target media set, the duration of the call record must be greater than 30 seconds and the percentage of non-talk time in the call must be less than 25% of the call duration. This functionality is summarized in the 'Description/Notes' indicator 1170.

After selecting the target media set for the 'Yes' answer value associated with the second evaluation question 1033, the administrative user 117 can click the 'OK' button 751 in the query/media set selection user interface 748 to confirm their selection. Referring to FIG. 14, after the administrative user 117 confirms their selection in the query/media set selection user interface 748, the query/media set selection user interface 748 closes and the evaluation configuration tool 322 is again presented to the administrative user 117. As was the case for the first evaluation question 331, in FIG. 14, the hyperlink 1049 for the 'Yes' answer value for the second evaluation question 1033 is updated to reflect that the evaluation agent 116 has selected the 'Call Flow' query to auto-suggest whether the 'Yes' answer is true.

Referring to FIG. 15, the administrative user 117 can repeat the query selection process for the 'No' answer associated with the second evaluation question 1033 by checking its associated auto-suggest checkbox 338 and then clicking the '(select)' hyperlink 1353 to enter the query/media set selection user interface 748. For the 'No' answer to the second evaluation question 1033, the administrative user 117 can choose the same, 'Call Flow' target media set and can choose 'is NOT detected' from an inversion control (not shown) on the user interface 748. After clicking 'OK' in the query/media set selection user interface 748, the auto-suggest fields 336 for both the 'Yes' and 'No' answers for the second evaluation question 1033 are complete, with an auto-suggest result of 'Yes' if the 'Call Flow' target media set is satisfied by the evaluation call record 228 and an auto-suggest result of 'No' if the 'Call Flow' target media set is not satisfied by the evaluation call record 228.

Once the administrative user 117 is satisfied with the configuration in the evaluation configuration tool 322, the administrative user 117 can click on a "Done" control 1370, indicating that the agent evaluation module 114 is configured for automatic analysis of evaluation call records.

4 Agent Evaluation

With the agent evaluation module 114 configured for automatic analysis of evaluation call records, the evaluation agent 116 can select (via the UI module 218) an evaluation call record 228 for analysis. With an evaluation call record 228 selected, the evaluation agent 116 can trigger the call analyzer 220 to analyze the evaluation call record 228 according to the selected queries and target media sets 226 and to provide the call analysis results 230 to the UI module 218.

Figure 16:
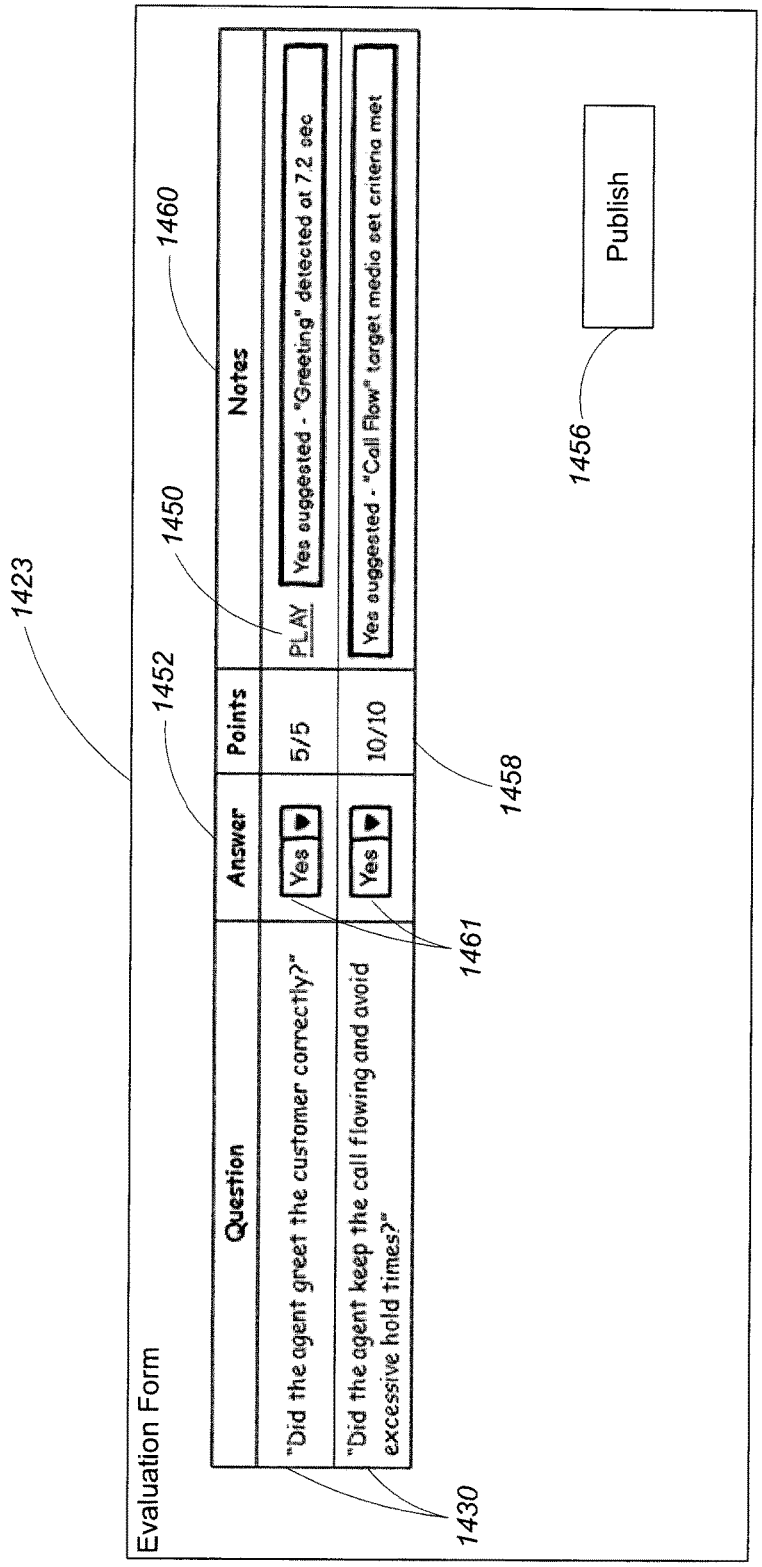
FIG. 16 is an agent evaluation result form.

Referring to FIG. 16, the UI module 218 uses the call analysis results 230 to generate an evaluation result form 1423 for display to the evaluation agent 116. The evaluation result form 1423 includes the evaluation questions 1430 from the evaluation form 221, an auto-suggested answer 1452 for each evaluation question 1430 a number of evaluation points 1458 for each evaluation question 1430, and a notes field 1460 for each evaluation question 1430.

The auto-suggested answer 1452 for each evaluation question 1430 indicates the answer to the evaluation question 1430 that was determined by the call analyzer's 220 application of the query or target media set(s) associated with the evaluation question 1430 to the evaluation call record 228. In FIG. 16, the auto-suggested answer 1452 for the first evaluation question 331 is 'Yes' indicating that the 'Greeting' query was satisfied by the evaluation call record 228. The auto-suggested answer 1452 for the second evaluation question 1033 is 'Yes' indicating that the evaluation call record 228 meets the criteria of the 'Call Flow' target media set. Since the auto-suggested answers 1452 for both of the questions 331, 1033 have a value of 'Yes,' each of the questions 331, 1033 receive the full number of evaluation points 1458 (i.e., 5/5 and 10/10, respectively).

In some examples, the notes field 1460 for each evaluation question provides an indication of the suggested answer, which query or target media set was satisfied, where a query was detected, and any other information which may be useful to the evaluation agent 116. For example, in FIG. 16 the notes field 1460 for the first evaluation question 331 notes that an answer of 'Yes' was suggested and that the 'Greeting' query was detected at the 7.2 second timestamp of the evaluation call record 228.

In some examples, the notes field includes a verification hyperlink 1450 (or another suitable control) which allows the evaluation agent 116 to listen a portion of the evaluation call record 228 to verify that the auto-suggested answer 1452 is correct. For example the notes field 1460 for the first evaluation question 331 includes a 'PLAY' hyperlink 1450 on which the evaluation agent 116 can click to hear the portion of the evaluation call record 228 which ostensibly satisfies the 'Greeting' query. In some examples, if the evaluation agent 116 disagrees with an auto-suggested answer 1452 for a given evaluation question 1430, they can choose a different answer for the evaluation question 1430 using a dropdown menu 1452 in the auto-suggested answer's field.

In some examples, once the evaluation agent 116 is satisfied with the evaluation result form 1423, they can click on the 'Publish' button 1456 to exit the evaluation result form 1423 and receive an evaluation report (not shown) including an overall evaluation score which is the sum of the evaluation points 1458 column in FIG. 16.

5 Alternatives

In some examples, the query or target media set selection user interface also includes a user interface for defining new queries and target media sets.

While the above description mentions evaluation of script adherence as a goal of the agent evaluation system, there are other factors which the agent evaluation system is capable of evaluating. For example, if a customer were to call a company's (e.g., a television company) with an issue about their service, an agent handling the call is likely to have a number of troubleshooting steps they need to go through with the customer prior to sending a technician to the customer's site (which is relatively expensive for the company). The agent evaluation system described above can automatically determine whether the customer service agent has gone through the required steps with the customer. For example, the agent evaluation system can auto-answer questions such as: "Did the agent send a technician?" by looking for phrases associated with that action. Further, the agent evaluation system can auto-answer questions such as: "Did the agent take appropriate troubleshooting steps prior to scheduling a visit?" by looking for phrases related to those troubleshooting steps (e.g., "reset the box", "send a signal to the box to see if it is responding", etc.)

In some examples, a supervisor at the customer service call center hand selects the evaluation call record. In other examples, a quality evaluator automatically selects the evaluation call record based on characteristics of the call including but not limited to call quality and call content.

In the examples described above, an administrative user can select a query or a target media set and then choose to invert the query or target media set (e.g., by activating an 'is NOT detected' control). However, in other examples, the administrative user may simply create separate query that is the inverse of the selected query rather than choosing an 'is NOT detected' control.

While the examples described above illustrate an evaluation form having answers auto-suggested for all of its questions, in other examples, the evaluation agent may manually enter answers for at least some of the questions into the evaluation form.

In the examples described above, the administrative user 117 has associated all of the answers for all of the questions in the evaluation form with queries or target media sets. However, in some examples the administrative user 117 may choose to not specify a query for one or more answers of the questions. In such cases, the agent evaluation system simply leaves the answer blank so the evaluation agent can manually determine the best answer. In some examples, questions that are not appropriate for automatic answering include questions that are subjective in nature (e.g., "Did the agent show appropriate empathy throughout the call.")

6 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. A computer implemented method for determining evaluation information using audio data, performed on a computer having a processor, memory, and one or more code sets stored in the memory and executing in the processor, the method comprising:
   receiving, by the processor, a specification of an evaluation form, the evaluation form including a plurality of questions, each question having a plurality of possible answers;
   receiving, by the processor, input from a user indicating that a first answer of the plurality of possible answers for a first question of the plurality of questions should be determined automatically from the audio data, the audio data including speech of a subject;
   receiving, by the processor, input from the user associating a first constraint of a plurality of constraints with the first answer, wherein the first constraint includes a textual expression and a temporal constraint;
   processing, by the processor, the audio data to determine whether the audio data putatively satisfies the first constraint, wherein processing the audio data to determine whether the audio data putatively satisfies the first constraint includes processing the speech of the subject in the audio data to identify putative instances of the textual expression, and determining whether the putative instances of the textual expression satisfy the temporal constraint;

assigning, by the processor, the first answer as an answer to the first question if the audio data putatively satisfies the first constraint; and storing, by the processor, the first answer as the answer to the first question in the evaluation form.

2. The method of claim 1 wherein the first answer is associated with an evaluation point value, the method further comprising determining an overall evaluation score including adding the evaluation point value associated with the first answer to the overall evaluation score if the audio data putatively satisfies the first constraint.

3. The method of claim 1 further comprising, if the audio data putatively satisfies the first constraint, presenting an indication of a time in the audio data at which the audio data putatively satisfies the first constraint to the user.

4. The method of claim 3 further comprising receiving an indication of the user's desire to listen to the time in the audio data at which the speech of the audio data putatively satisfies the first constraint, and in response to the indication, audibly presenting a portion of the audio data proximal to a time in the audio data at which the audio data putatively satisfies the first constraint.

5. The method of claim 1 further comprising, if the first answer is assigned to the first question, receiving input from the user confirming that the first answer to the first question is satisfied by the audio data.

6. The method of claim 1 further comprising, if the first answer is assigned to the first question, receiving input from the user assigning a second answer of the plurality of answers for the first question as the answer to the first question.

7. The method of claim 1 wherein the first constraint includes a Boolean expression.

8. The method of claim 1 wherein the first constraint includes a metadata constraint and processing the audio data to determine whether the audio data putatively satisfies the first constraint includes comparing a metadata of the audio data to the metadata constraint.

9. The method of claim 1 wherein at least some of the plurality of possible answers for at least some of the plurality of questions are answered manually.

10. The method of claim 1 further comprising selecting the audio data from a plurality of audio data units based on quality of the audio data.

11. The method of claim 10 wherein the quality of the audio data includes an audio quality of the audio data.

12. The method of claim 10 wherein the quality of the audio data includes a quality of a content of the audio data.

13. A computer implemented system for determining evaluation information using audio data, the system comprising:

an input for receiving a specification of an evaluation form, the evaluation form including a plurality of questions, each question having a plurality of possible answers;

an input for receiving input from a user indicating that a first answer of the plurality of possible answers for a first question of the plurality of questions should be determined automatically from the audio data, the audio data including speech of a subject;

an input for receiving input from the user associating a first constraint of a plurality of constraints with the first answer, wherein the first constraint includes a textual expression and a temporal constraint;

an audio processor for processing the audio data to determine whether the audio data putatively satisfies the first constraint, wherein the audio processor for processing the audio data to determine whether the audio data putatively satisfies the first constraint processes the speech of the subject in the audio data data to identify putative instances of the textual expression, and determines whether the putative instances of the textual expression satisfy the temporal constraint; and a form completion module for assigning the first answer as the answer to the first question if the audio data satisfies the first constraint and storing the first answer as the answer to the first question in the evaluation form.

14. A non-transitory computer readable medium comprising software embodied on the medium, the software including instructions, executable by a programmable processor, for causing an information processing system to:

receive a specification of an evaluation form, the evaluation form including a plurality of questions, each question having a plurality of possible answers;

receive input from a user indicating that a first answer of the plurality of possible answers for a first question of the plurality of questions should be determined automatically from the audio data, the audio data including speech of a subject;

receive input from the user associating a first constraint of a plurality of constraints with the first answer, wherein the first constraint includes a textual expression and a temporal constraint;

process the audio data to determine whether the audio data putatively satisfies the first constraint, wherein processing the audio data to determine whether the audio data putatively satisfies the first constraint includes processing the speech of the subject in the audio data to identify putative instances of the textual expression, and determining whether the putative instances of the textual expression satisfy the temporal constraint;

assign the first answer as an answer to the first question if the audio data putatively satisfies the first constraint; and store the first answer as the answer to the first question in the evaluation form.

* * * * *